Oct. 5, 1965 A. K. LITTWIN 3,209,891

MAGNETIC WORK HOLDER AND METHOD

Filed Dec. 14, 1961 4 Sheets-Sheet 1

Inventor:
Arthur K. Littwin
By Horton, Davis, Brewer & Brugman Attys

Oct. 5, 1965 A. K. LITTWIN 3,209,891

MAGNETIC WORK HOLDER AND METHOD

Filed Dec. 14, 1961 4 Sheets-Sheet 2

Inventor:
Arthur K. Littwin
By Horton, Davis,
Brewer + Brugman Attys.

MAGNETIC WORK HOLDER AND METHOD

Filed Dec. 14, 1961 4 Sheets-Sheet 3

Inventor:
Arthur K. Littwin
By Horton, Davis, Brewer & Brugman Attys

Oct. 5, 1965 A. K. LITTWIN 3,209,891

MAGNETIC WORK HOLDER AND METHOD

Filed Dec. 14, 1961 4 Sheets-Sheet 4

Inventor:
Arthur K. Littwin
By Horton, Davis, Brewer + Brugman
Attys

1

3,209,891
MAGNETIC WORK HOLDER AND METHOD

Arthur K. Littwin, Lincolnwood, Ill., assignor, by mesne assignments, to Arthur K. Littwin, Robert L. Littwin, Horace A. Young, and Donald Littwin, trustees of Littwin Family Trust No. 1

Filed Dec. 14, 1961, Ser. No. 159,347
14 Claims. (Cl. 198—41)

The present invention relates to a magnetic work holder for holding work pieces thereon for use in performing a working operation on the work pieces; in some instances the work holder may be termed a chuck.

The magnetic work holder of the present invention incorporates a permanent magnet for directly holding the work or work piece while the operation is being performed thereon; an electromagnet is utilized for counteracting the magnetism of the work holder for removing the work pieces therefrom.

The work holder of the present invention may be used in any of a large number of kinds of installations, but its use in any installation is closely associated with the capability of the work holder to be moved or carried as by a conveyor. Due to the fact that the work holder is a permanent magnet, it can be moved freely on a conveyor without the necessity for accommodating or providing for electrical wires, slip rings or sliding contacts of any kind. The electromagnet utilized for removing the work pieces from the work holder need be the only portion of the entire installation that incorporates electrical wires or other kinds of electrical connections.

A broad object of the invention is to provide novel apparatus for holding work pieces on a permanent magnet work holder by magnetism, and removing the work pieces therefrom by an electromagnet.

Another object is to provide apparatus of the kind just referred to, and method, in which the permanent magnet work holder is at least partially demagnetized for removing the work pieces therefrom, but is thereafter magnetized for putting it in condition for again holding work pieces thereon.

Another object is to provide novel apparatus and method for magnetizing and demagnetizing, in which a permanent magnet work holder is demagnetized by a series of electromagnets by the simple step of passing the permanent magnet serially in magnetic working relation therewith.

A further object of the invention is to provide novel work holder or chuck means made up of two parts which include a base section, and a top section having a pattern of holding magnets thereon, the top section being detachably secured to the base section whereby a plurality of interchangeable top sections having different patterns of holding magnets may be selectively utilized in conjunction with the base section to eliminate the necessity for having a plurality of complete chucks in order to provide different patterns of holding magnets.

Other objects and advantages of the invention will appear from the following detailed description taken in conjunction with the accompanying drawings, in which.

Figure 3:
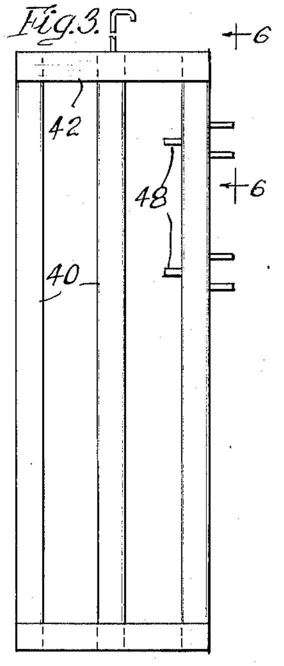
FIGURE 3 is a view of the rack from the opposite side shown in FIGURE 2.
Figure 4:
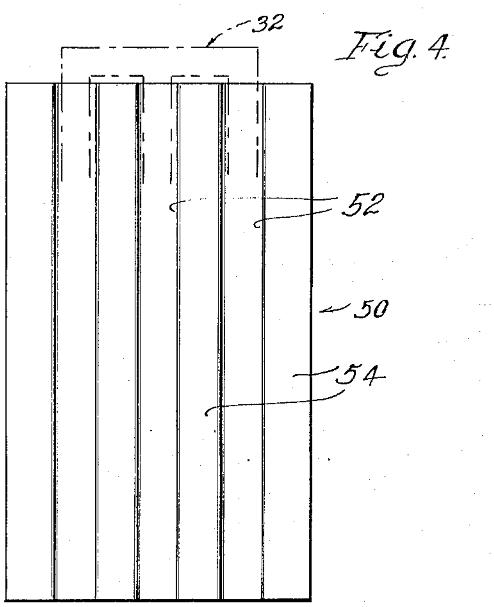
FIGURE 4 is the front or face view of the electromagnet utilized for controlling the magnetism of the rack.
Figure 6:
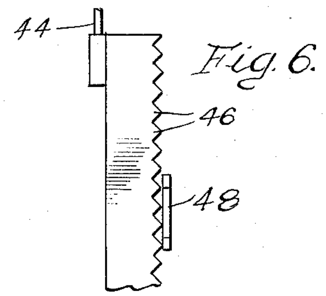

2 magnet of FIGURE 4, with the top portion of the casing removed to show the interior thereof;

FIGURE 6 is a detail view taken at line 6—6 of FIGURE 3.

Figure 1:
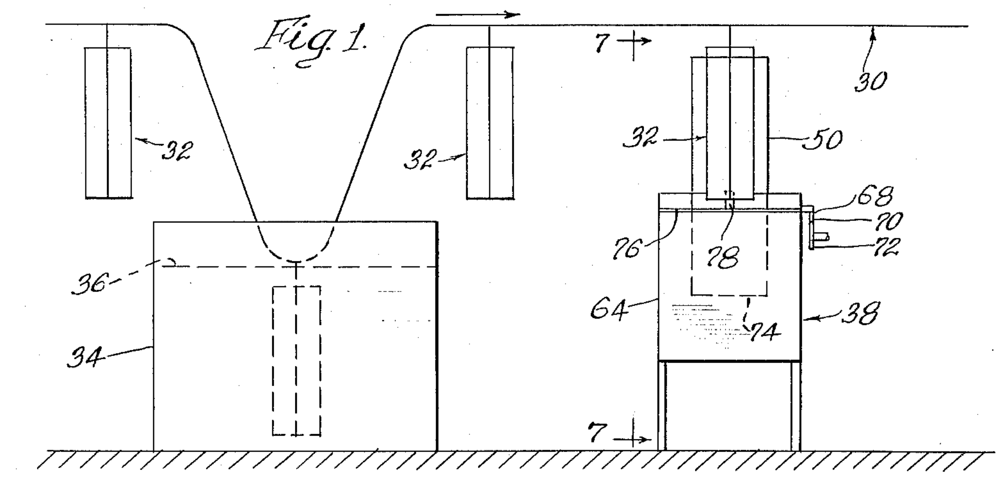
FIGURE 1 is a diagrammatic view of a conveyor carrying permanent magnet work holders, in the form of plating racks, according to the invention, together with other apparatus associated with the conveyor.
Figure 7:
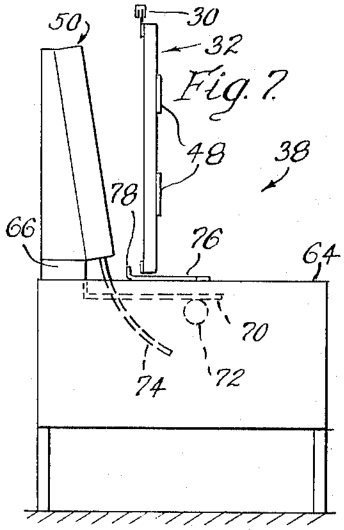
Figure 8:
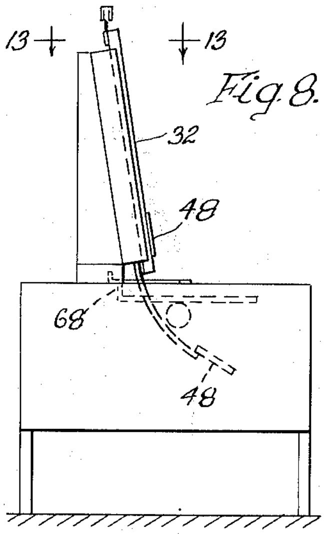
Figure 9:
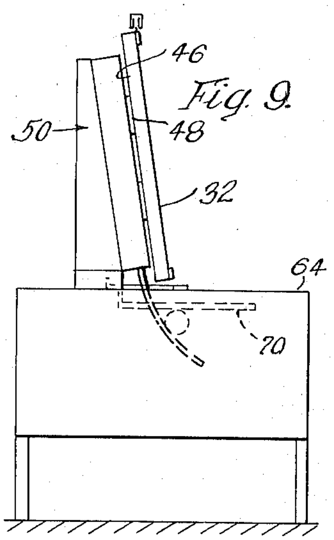
Figure 10:
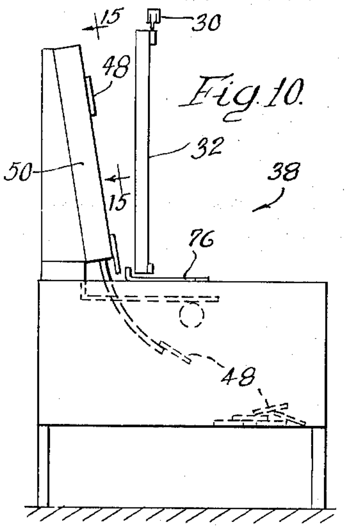
Figure 11:
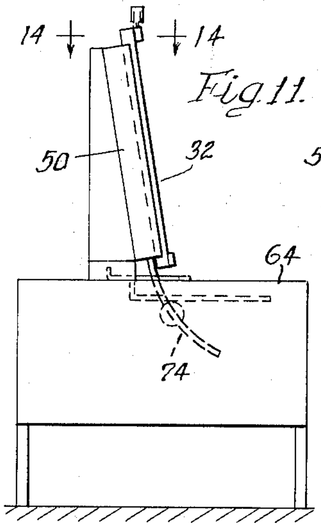
Figure 12:
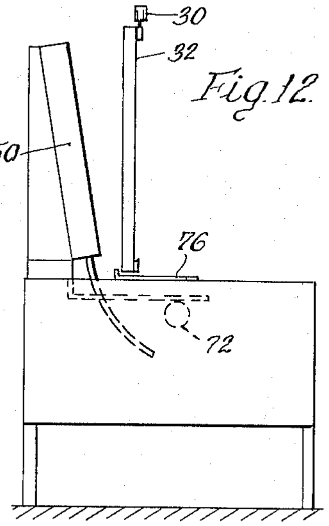
Figure 13:
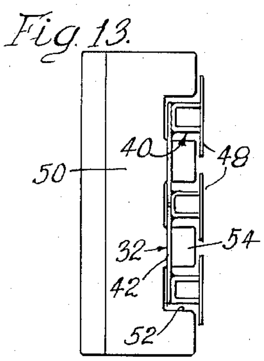
Figure 14:
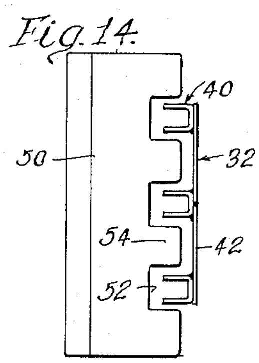
Figure 15:
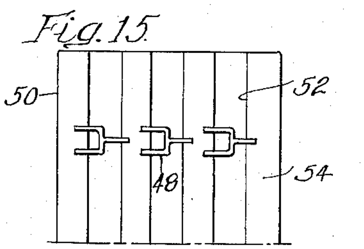
Figures 16, 17:
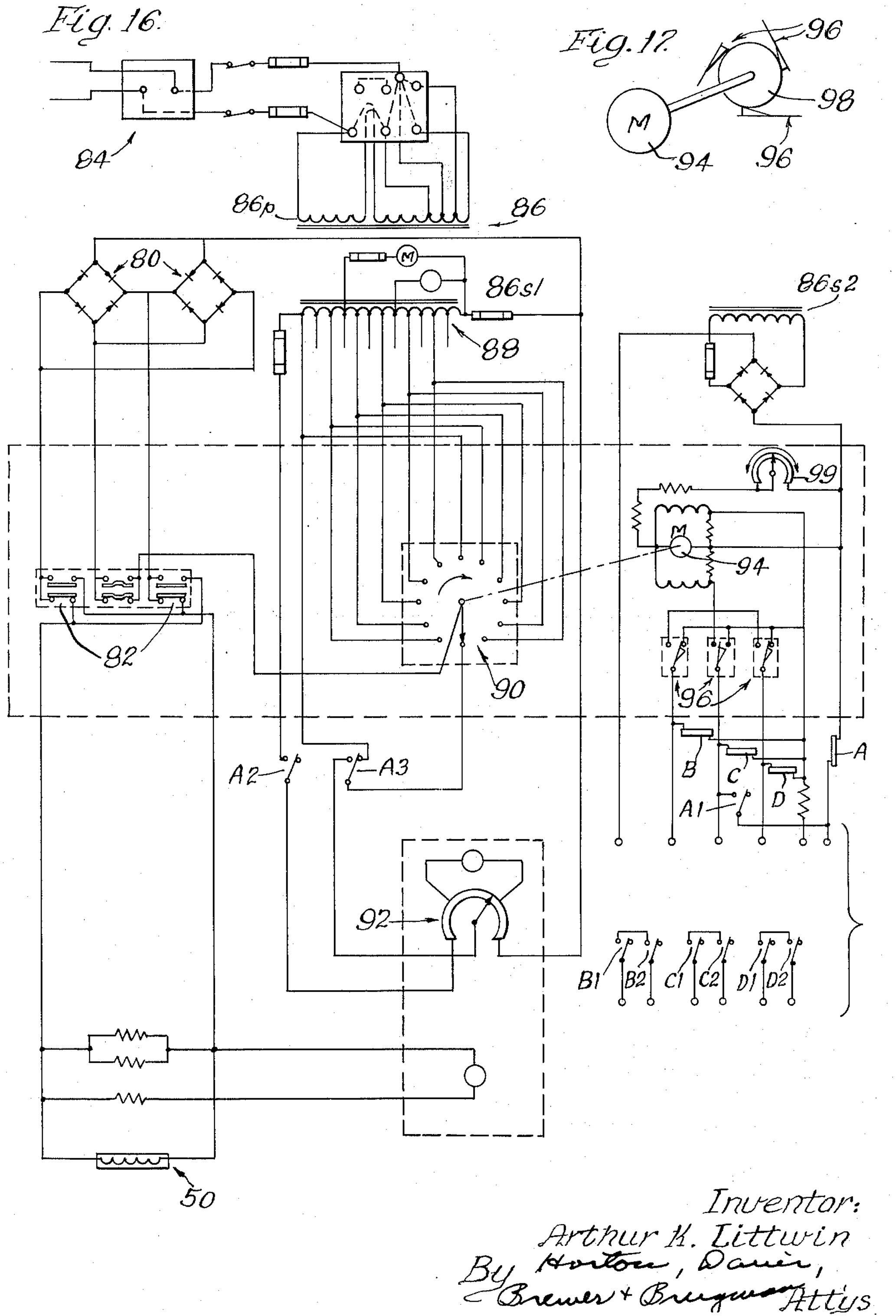
Figure 18:
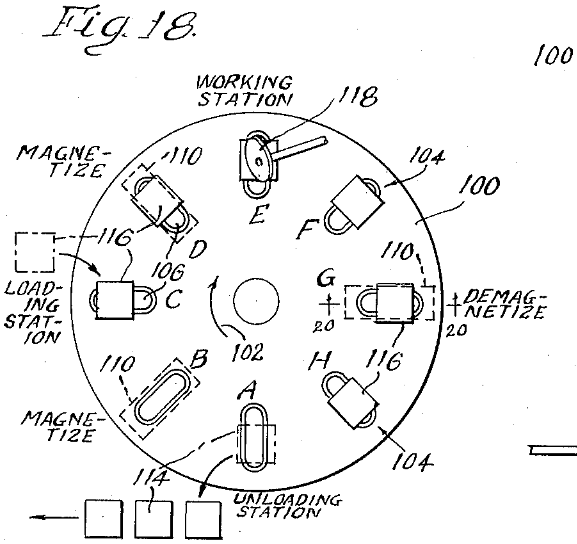
Figure 19:
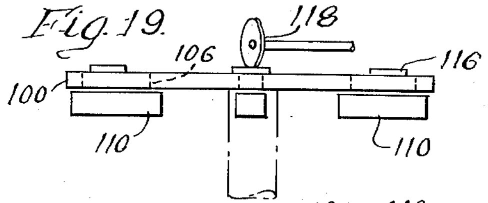
Figure 20:
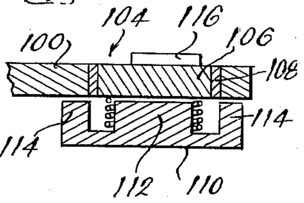
Figure 21:
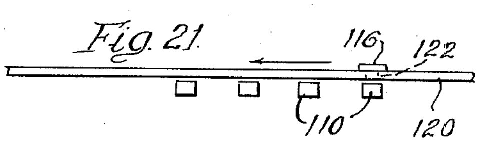
Figure 22:
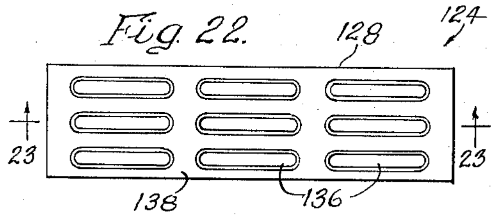
Figure 23:
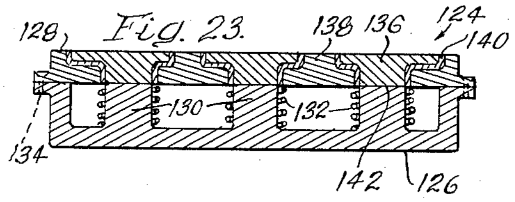
Figure 24:
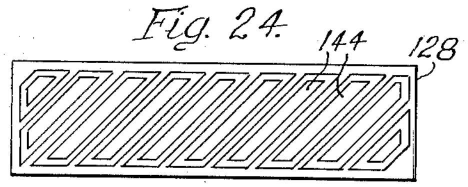
Figure 25:
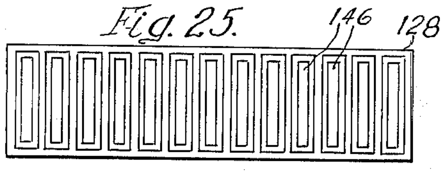

FIGURE 7 is a diagrammatic view taken at the line 7—7 of FIGURE 1 and showing certain portions of the apparatus in a first position;

FIGURE 8 is a view similar to FIGURE 7, but showing portions of the apparatus in a second position;

FIGURE 9 is a view similar to FIGURE 7, but indicating a slightly different method of utilizing the apparatus;

FIGURE 10 is a view similar to FIGURE 9, but showing pieces of the apparatus in a different position;

FIGURE 11 is another view similar to FIGURE 9, but showing pieces of the apparatus in a still different position;

FIGURE 12 is a view similar to FIGURE 9 but showing pieces of the apparatus in still another position;

FIGURE 13 is a view taken at line 13—13 of FIGURE 8, but including only the elements lying in the plane of that line;

FIGURE 14 is a view taken at line 14—14 of FIGURE 11, but showing only the elements lying in the plane of that line;

FIGURE 15 is a view taken at line 15—15 of FIGURE 10;

FIGURE 16 is a diagram of the electrical circuit utilized in the apparatus;

FIGURE 17 is a fragmentary diagrammatic view of a motor and certain cam means incorporated in the apparatus of FIGURE 16;

FIGURE 18 is a plan view of a modified form of apparatus utilizing the present invention;

FIGURE 19 is an edge view of the apparatus of FIGURE 18;

FIGURE 20 is a large scale sectional view taken at line 20—20 of FIGURE 18;

FIGURE 21 is a diagrammatic view of a slightly modified form of apparatus utilizing the present invention;

FIGURE 22 is a plan or face view of a magnetic chuck according to the present invention;

FIGURE 23 is a sectional view taken at line 23—23 of FIGURE 22;

FIGURE 24 is a plan or face view of a chuck similar to that of FIGURE 22, but showing a different pattern of holding elements; and FIGURE 25 is a plan or face view of another form of chuck similar to that of FIGURE 22, but showing a still different pattern of holding elements.

As an example of the various installations in which the invention can be used, FIGURES 1–16 show a plating apparatus in which plating racks are formed by permanent magnets for holding pieces to be plated and the racks with the pieces thereon are carried through a plating solution. The apparatus of FIGURES 18 to 20 is for use in a grinding operation in which permanent magnets are utilized for holding the work pieces in position while the grinding operation is performed thereon. The remaining figures also show forms of work holders that may be used in various kinds of working operations.

Referring in detail to the drawings, and particularly, to FIGURES 1 to 16, a conveyor 30 is illustrated diagrammatically, it being understood that various kinds of conveyors may be utilized. Carried by the conveyor is a plurality of plating racks 32, to be described in detail hereinbelow, and which are formed by permanent magnets for holding pieces thereon that are to be plated. The conveyor carries the racks through a tank 34 containing a plating solution as indicated at 36. After the racks pass through the tank and therebeyond, they are carried to an unloading station which includes apparatus 38 for removing the plated pieces from the racks.

Figure 2:
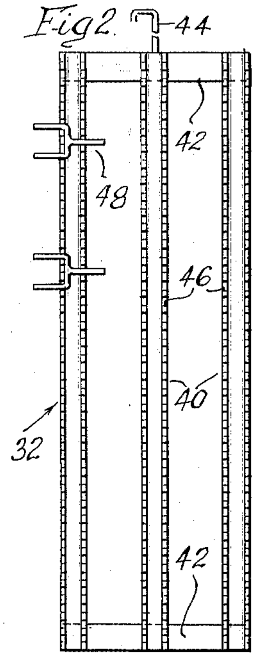
FIGURE 2 is a large scale view of a rack of FIGURE 1 oriented according to FIGURE 1.

The racks 32 are shown in detail in FIGURES 2, 3 and 6; they may assume various shapes and sizes, the present illustration being merely one example of many that may be used. In the present case, each rack 32 includes a plurality of and preferably three legs 40, each of which is U-shaped in cross-section (FIGURE 13). These legs are secured to cross pieces 42 at the ends thereof as by welding to form a unitary and rigid rack. A suitable hook 44 is provided for hanging the rack from the conveyor. Preferably each flange of the U-shaped piece making up each arm 40 is formed with a series of teeth 46 (FIGURE 6) for facilitating holding the work pieces 48 thereon, and to minimize the area of contact between the rack and work piece to provide maximum plating coverage of the work piece. The work piece 48 is merely a random example of work pieces that may be held on the rack.

Figure 5:
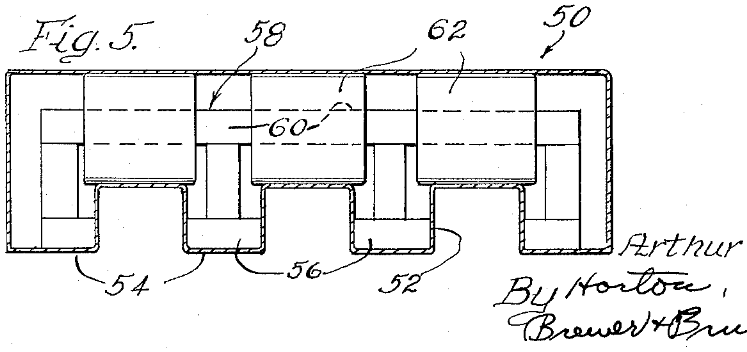
FIGURE 5 is a large scale top view of the electro-

In FIGURES 4 and 5 is shown an electromagnet 50, included in the apparatus 38 of FIGURE 1, that is utilized for removing the work pieces from the plating racks, by demagnetizing the racks. After this step in the operation, the racks are again magnetized by that electromagnet, as explained fully hereinbelow.

The electromagnet 50 is provided with a plurality of grooves or channels 52 which are the same in number as the legs 40 of the racks, namely three, for receiving those legs in removing the work pieces from the racks. As shown in FIGURE 5, which is a top view of the electromagnet of FIGURE 4 with the top casing element removed, it will be noted that a plurality of poles 54 are provided on opposite sides of the channels or grooves 52 and which form those channels or grooves. In the poles 54 are pole pieces 56, part of an assemblage 58, which includes a core 60 surrounded by three coils 62. These coils are conventional electrical coils utilized in electromagnets, and provide a magnetic circuit of the desired polarity in the poles 54 which is impressed on the rack in removing the work pieces therefrom .

The racks 32 are permanent magnet members, being made of suitable steel to provide such characteristics. The steel known as "Alnico" has been found to be a satisfactory material for this purpose. Normally, and in the absence of any external magnetic influences, the Alnico metal is a permanent magnet, retaining its magnetism indefinitely. However, that material can be demagnetized, and is so demagnetized in the practice of the present invention for releasing the work pieces 48 held thereon. In the plating operation, operators manually load the racks, i.e., place the work pieces 48 thereon. The two flanges of each leg 40 provide a plurality of points of engagement for each work piece, for stably holding it. The racks, when in the loading position, i.e., where the operators load the work pieces thereon, are of course in magnetized condition.

The apparatus 38 includes, in addition to the electromagnet 50, and as shown in FIGURE 7 to 12, as well as FIGURE 1, a receptacle 64 which may be a tank or box mounted on a suitable stand and supporting the electromagnet 50 thereon. The electromagnet 50 is supported directly on a base element 66 which is mounted on the receptacle 64 for sliding movement thereon within a limited range in reciprocating movements to the right and left in FIGURE 7 between the limits indicated by the relative positions thereof in FIGURES 7 and 8. The base element 66 is provided with an arm 68 (FIGURE 1) on which is mounted a rack 70 meshing with a pinion 72. The pinion 72 may be driven by suitable means such as an electric motor, as described in detail hereinbelow, and pursuant to rotation thereof and acting through the rack, the electromagnet 50 is advanced from the position of FIGURE 7 to that of FIGURE 8 and retracted. The electromagnet 50 may be provided with a deflecting apron to control the movement of the work pieces into the receptacle.

In the practice of the method of the invention, the conveyor 30 (FIGURE 1) in its regular operation, is brought to a stop with a rack in register with the electromagnet 50. Such a position is represented at the right-hand side of FIGURE 1, and in FIGURES 4 and 13, and in that position legs 40 of the rack are in direct register with the channels or grooves 52. Then the electromagnet 50 is advanced from the position of FIGURE 7 to that of FIGURE 8. Preferably, the electromagnet is disposed at an inclination as indicated for assisting the entrance of the legs 40 into the channels or grooves. The depth of the channels or grooves is correlated with the corresponding dimension of the legs so that the legs are disposed almost entirely within the channels or grooves (see FIGURE 13), although the exact extent thereof is not critical. In the position of FIGURE 8, the next step in the method is the demagnetizing operation, and in such operation the electromagnet is demagnetized as described hereinbelow, particularly in connection with FIGURE 16. The flux from the poles 54 is impressed on the legs 40, demagnetizing the latter and thereupon the work pieces 48 are released from the rack and they drop into the receptacle 64 as indicated in FIGURE 8. After the work pieces are so released from the rack and while the conveyor remains stationary, and further with the electromagnet in the advanced position of FIGURE 8, the electromagnet is magnetized under the control of the circuit of FIGURE 16, magnetizing the rack. Thereafter, the pinion 72 is operated for retracting the electromagnet to its position of FIGURE 7. Suitable retainer means 76 is provided on the receptacle 64 having a hook element 78 positioned for engagement by the lower end of the rack to retain the rack in proper position against the attractive action of the electromagnet in the movement of the latter to its retracted position of FIGURE 7. After the electromagnet is thus retracted, the conveyor is advanced another increment to bring the next rack 32 to the unloading or demagnetizing location.

It will be observed that the work holders can be maintained normally uniform from the standpoint of magnetization so that the work pieces will be uniformly held thereon, but nevertheless controllably demagnetized sufficiently to release their work pieces.

While the foregoing specific arrangement of the various members in the demagnetizing operation is the preferred arrangement, it is also possible to remove the work pieces from the racks in a reverse position of the racks, as represented in FIGURES 9 to 12. In the latter position of the apparatus, the racks 32 (FIGURE 9) are turned with the side containing the teeth 46 toward the electromagnet 50. In such position in the first step of the demagnetizing operation, the electromagnet, in magnetized condition, is advanced to the position of FIGURE 9, in which the work pieces 48 engage the electromagnet and bridge the channels or grooves 52 (see also FIGURE 15), and the rack remains spaced from the electromagnet by the interposition of the work pieces therebetween. As the next step in this demagnetizing operation, the electromagnet is retracted to the position of FIGURE 10, and in this operation the retaining means 76 retains the rack against movement following the electromagnet, and the electromagnet having been magnetized to a degree greater than the magnetism of the rack, removes the work pieces from the rack. As the next step, the electromagnet is demagnetized in the manner referred to above and described hereinbelow, and the work pieces fall therefrom into the receptacle 64. As the next step, the electromagnet is advanced to the position of FIGURE 11 in which the legs 40 are received in the channels or grooves 52 (see also FIGURE 14). Then the electromagnet is again magnetized to the desired degree, which magnetizes the rack in the same manner as described above in connection with FIGURE 8. Thereafter, the electromagnet is retracted to the position indicated in FIGURE 12, and in this case again the retainer means 76 prevents the rack from following the electromagnet. Thereafter, the conveyor 30 is advanced to bring the next rack into position for unloading.

Attention is now directed to FIGURE 16 showing the diagram of the electrical circuit utilized in the apparatus, and to FIGURE 17 showing a detail of that electrical apparatus. The demagnetizing circuit is essentially similar to that shown in my prior Patent No. 2,825,854, issued March 4, 1958, but a brief description of the operation thereof is given here for convenience. The electromagnet 50 referred to above is shown in the lower lefthand corner of FIGURE 16. Direct current is impressed on this electromagnet from rectifier means 80 through reversing switches 82. The source of current for the apparatus is indicated at 84, which provides alternating current through a transformer 86 including a primary 86*p* and secondaries 86*s*1 and 86*s*2. The secondary 86*s*1 includes a plurality of tappings for providing different voltage values, the current being controlled by switch means 90, whereby through a cycle of operation of this switch means the connections through the tappings 88 are successively made and the voltage impressed is successively reduced in steps to a value near zero. The alternating current passing through the switch 90 is converted by the rectifier means 80 to direct current, as stated. As the value of the voltage impressed on the electromagnet is successively reduced in a series of steps, the direct current is reversed by means of the switches 82, and the effect is a demagnetizing operation to a value represented by the voltage on the last tapping of the transformer which may, for example, be ⅙ of the original.

The switch means 90 is controlled by a motor 94 incorporated in a circuit means which includes the secondary 86*s*2 referred to above. The motor 94 also controls a series of switches 96 incorporated in the apparatus represented in FIGURE 16, these switch means being operated by suitable cam means 98 (FIGURE 17) driven by the motor and actuating the switches upon rotation of the cam means in a given cycle of operation.

Other details of the operation of the apparatus represented in FIGURES 16 and 17 may be obtained from my prior patent referred to above. The apparatus includes control switch means for magnetizing the electromagnet 50 to full value for magnetizing the rack. Thereafter, when it is desired to demagnetize the rack, the apparatus of FIGURE 16 is put into operation, and it progresses through its cycle in which the electromagnet and rack are demagnetized.

Variable power and speed are provided for, the former through a potentiometer 92 and the latter through a potentiometer 99 associated with the motor 94. It may be desired to vary the power for any of several factors, such, for example, as mass of the material to be magnetized and demagnetized, as well as to prevent distortion of fragile or weak work pieces when they are held against the electromagnet 50 (FIGURE 15) over the channels or grooves 52. It may be desired to vary the speed similarly for any of several reasons, such, for example, as the mass of the work pieces, the material of the work pieces, etc.

Included in the electrical portion of the apparatus is a relay including a solenoid A and switch means A1, A2 and A3 controlled thereby; similarly other relays including solenoids B, C and D operating switches B1 and B2, C1 and C2 and D1 and D2, respectively. The controls incorporated in the electrical apparatus of FIGURE 16, such as these relays, include those necessary for controlling the operation of the conveyor 30 of FIGURE 1 in order to render the complete apparatus automatic. For example, the position of the apparatus and racks thereon shown in FIGURE 1 may be arbitrarily selected as a starting point. The conveyor will remain stationary sufficiently long for the work pieces in the plating tank 34 to be plated, or the operation of removing the work pieces in the receptacle 64, whichever is the longer. Then the controls that are controlled by the cam means 98 and motor 94 (FIGURE 17) operate to move the electromagnet 50 (FIGURE 7) forward to the position of FIGURE 8; it then is put through its demagnetizing cycle in which the work pieces drop from the rack; then the electromagnet is put through a magnetizing cycle to magnetize the rack; then the apparatus is operated to move the electromagnet to the position of FIGURE 7; the conveyor is advanced to bring the next rack to the position for moving the work pieces therefrom; and the operation is repeated.

It will be understood that the work holders, or racks, may be carried any distance desired, being limited only by practical considerations. For example, a conveyor having such racks may be moved throughout long distances in a plant, a great advantage in this respect being observed, namely that the work holders or racks need have no electrical connections therewith which would require complicated accommodations due to the movement of the work holders. In the present instance, the only instrumentality that need have electrical connections therewith is the electromagnet 50, and that is in a single location and is movable only a limited distance. A single electromagnet will serve unlimited numbers of work holders.

The apparatus shown in FIGURES 18, 19 and 20 embodies the principles of operation of the apparatus described above in that the work holders are permanent magnets, and they are magnetized and demagnetized by an electromagnet. In the present apparatus, a table 100 of magnetic material is provided. This table is mounted in any suitable manner for rotation in either direction, arbitrarily indicated as counterclockwise by the arrow 102. This table includes a plurality of work holders 104 which for convenience may be eight in number. Each work holder 104 includes a central member or insert 106, which may be of "Alnico" or other material suitable for forming a permanent magnet. This insert is disposed in a cavity in the table 100, and surrounded by babbitt 108 or similar non-magnetic material for securing the insert 106 in place. An electromagnet 110 is provided at each of certain stations around the table 100 as explained hereinbelow for magnetizing and demagnetizing the work holder 104. The electromagnets 110, each of which includes a central pole 112 and end poles 114, are disposed at suitable locations, such as immediately under the table, and are of such size and proportions relative to the work holder 104 for desired magnetizing and demagnetizing relation therewith, in the rotation of the table relative thereto. When the work holder comes to a position directly over an electromagnet 110, as it does, the work holder insert 106 is magnetized in accordance with the value of the voltage impressed on the electromagnet and in the direction of the polarity thereof.

The table 100 is in essential respects similar to the conveyor 30, being adapted to carry work pieces through a given path. The work holders 104 are distributed around the periphery of the table and are indicated as certain stations identified by letters A to H inclusive. Beginning arbitrarily at station C, a work piece 116 is placed on the table over the work holder 104, which may be magnetized at either stations B or D. Assuming it is to be magnetized at station B, the electromagnet 110 thereunder is brought up to full magnetization value and when the work holder is in register therewith the latter becomes magnetized. When the work holder progresses to station C, the operator places the work piece 116 thereon, it being understood that the work piece is of magnetic material, and is held securely in place by the magnetism of the work holder. It may desired to place the work piece 116 on the work holder before the latter is magnetized, and in that event an electromagnet 114 may be disposed at station D. In the latter case, the electromagnet at the latter station is magnetized when the work holder is thereover. Magnetizing the work holder together with the work piece thereon has an advantage in that less magnetizing force is required than in the case where the work holder alone is magnetized sufficiently for properly holding the work piece in place.

The table 100 is then rotated to the next position where the work piece 116 is at station E where a working operation is performed thereon, such as a grinding operation by the grinding wheel 118. After this operation is performed, the table is rotated to bring the work piece in question to station G, where the electromagnet 110 thereunder is put through its demagnetizing cycle which demagnetizes the work holder and workpiece. Then the table is rotated further to bring the work holder in question to station A, where the operator removes the work piece from the table.

The demagnetizing and the magnetizing operations may be performed either manually or automatically in accordance with any desired pattern of operation of the apparatus. Similarly, the arrangement may be selectively set up for intermittent or continuous operation. The present assumed working operation, namely, the grinding of the work piece at station E, presupposes that the table 100 is stationary, at least temporarily, and thus an intermittent operation is performed, but it is to be understood that this is merely an example. In the case of an intermittent operation, the demagnetizing and magnetizing operations conveniently are performed while the table is stationary, but in the case of a continuous operation, it is practical to perform these demagnetizing and magnetizing operations while the table is in movement.

In the present apparatus similar to the first embodiment of the invention the work holder consists of a permanent magnet, and it may be moved through an indeterminate and practically unlimited range of movement in the operation of the apparatus, while the means for magnetizing and demagnetizing remain stationary. In the present instance, the plurality of electromagnets 110 are utilized, but it will be understood that instead of that arrangement, a single such electromagnet may be utilized for performing the demagnetizing and magnetizing operations.

The present invention also encompasses another novel form of demagnetizing. Attention is now directed to FIGURE 21, which shows a conveyor 120 which may be in the form of a belt, a table, or any other form of conveyor, and one that has an unlimited range of movement. This conveyor 120 has a permanent magnet work holder 122 therein, which may be actually embedded therein or otherwise carried by the conveyor or mounted on or in or secured to the conveyor for magnetic cooperation with a series of electromagnets 110. A work piece 116 is carried by the conveyor, being placed over the work holder 122 therein, and magnetically held in place thereby. The electromagnets 110 are spaced along the conveyor at suitable intervals, and are positioned relative to the conveyor as indicated in FIGURE 20 for demagnetizing the work holder 122 and work piece 116 as the latter move over the electromagnets. The electromagnets 110, considering the selected direction of movement of the conveyor, which is to the left are progressively of lesser voltage value and of successively opposite polarity. Assuming that the work holder 122 and the work piece 116 were previously magnetized, as they were, for properly holding the work piece in place, the first electromagnet 110 is of a lesser value than the full magnetization thereof and of the opposite polarity. The next succeeding three electromagnets are similarly arranged, namely, of progressively lesser voltage value and successively opposite polarity. As the work holder and work piece pass thereover, they are progressively demagnetized by being magnetized in opposite directions and at progressively lesser values. Thus a demagnetizing operation is performed without putting an electromagnet through a demagnetizing cycle, such as when a single such electromagnet is used. The electromagnets remain fixed as to position, polarity and magnetization value.

The invention also includes a novel form of electromagnet or work holder or chuck, as illustrated in FIGURES 22 to 25. The principle involved in the present work holder is that the work holder or chuck is made of two parts, a main base section and a smaller top section containing a work holding surface and magnetic holding elements arranged in a predetermined pattern, according to the kind of work pieces to be held thereon. In the chuck indicated in its entirety at 124 is a base section 126 and a top section 128. The base section 126 includes a plurality of poles 130 with which electrical coils 132 are associated for producing the desired magnetization of the poles. The top section 128 is fitted to the bottom section, and may be detachably secured thereto mechanically, as by screws 134. The top section includes a plurality of magnetic work holder inserts 136 (permanent or soft) embedded in the magnetic main portion 138 of the top section, as by means of babbitt 140 or other non-magnetic material. The inserts 136 are arranged at their inner portions, as indicated at 142 for full magnetic engagement with the poles 130, but the upper portions of the inserts which are exposed through the top surface of the top section are of certain shapes and pattern as shown in FIGURE 22. The work holder elements in magnetic chucks are arranged in various predetermined patterns for accommodating work pieces of different sizes and shapes. In the course of operation in many plants, many different kinds of work pieces are encountered, and it is often necessary to provide work holder elements 136 of different patterns and arrangements to accommodate those different kinds of work pieces. Heretofore it has been necessary to change the entire chuck, but such is a large and expensive operation, it being necessary to provide a plurality of complete chucks. In the present instance, the top section 128 of the chuck can be removed, and another top section replaced on a single base section, having the desired and different arrangement and pattern of work holder elements. Such different patterns and arrangements of work holder elements are represented in FIGURES 24 and 25, identified as 144 and 146 respectively. The bottom section 126 constitutes the larger and much more expensive portion of the chuck, and if it is unnecessary to replace this portion, but only to replace relatively small top sections, a correspondingly great advantage in cost is realized.

While I have disclosed herein certain preferred embodiments of the invention, it will be understood that changes may be made therein within the scope of the appended claims.

I claim:

1. Apparatus of the character disclosed comprising a work holder of permanent magnetic material and adapted to magnetically hold magnetic work pieces, means for moving the work holder through a predetermined path, and electromagnetic means located adjacent the path and operative for demagnetizing the work holder and the work pieces thereon and thereby releasing the work pieces magnetically held thereby, and thereafter magnetizing the work holder.

2. Apparatus of the character disclosed comprising conveyor means and means for driving it through a predetermined path, a plurality of permanent magnet work holders on said conveyor means adapted to magnetically hold magnetic work pieces thereon and to carry them through the path of movement of the conveyor means for subjecting them to a working operation, electromagnetic means located adjacent said path and fixed in location relative to said movement of the conveyor means and positionable in magnetic relationship with the work holders individually, and control means for putting the electromagnetic means and a work holder in association therewith together with work pieces magnetically held on the work holder through a predetermined demagnetizing cycle and thereby demagnetizing the work holder and work pieces for releasing the work pieces, and thereafter energizing the electromagnet and thereby magnetizing the work holder.

3. The apparatus set out in claim 2 in which the electromagnetic means has poles forming spaces therebetween adapted for receiving elements of the work holder therein, the elements of the work holder forming magnetic flux paths between adjacent poles on opposite sides of respective ones of said elements.

4. The apparatus set out in claim 2 in which the electromagnetic means includes a single electromagnet operative for demagnetizing the work holders and the work pieces thereon and for magnetizing the work holders.

5. The apparatus set out in claim 2 in which the work holder has a work holding surface normally disposed upright whereby in response to demagnetizing the work holder and the work pieces thereon, the work pieces held thereby drop off.

6. The apparatus set out in claim 2 in which the electromagnetic means includes separate electromagnets spaced along the conveyor path for demagnetizing and magnetizing.

7. The apparatus set out in claim 2 in which the work holders include inserts in the conveyor means in magnetic circuit therewith, and the electromagnetic means is disposed for the work holders to pass closely therepast, and in magnetic relationship therewith when adjacent thereto.

8. The apparatus set out in claim 7 in which the conveyor means is a table with a top work holding surface, and the electromagnetic means is disposed under the table.

9. Apparatus of the character disclosed comprising a magnetizable piece, a plurality of electromagnets arranged serially and being progressively of lesser-value magnetization and successively of opposite polarity, and means for producing relative motion between the piece and electromagnets in mutual magnetic relationship and in such direction that the piece moves relatively from the greater-value to the lesser-value magnetization.

10. The apparatus set out in claim 9 in which conveyor means is provided, and the magnetizable piece is a permanent magnet work holder carried by the conveyor means and adapted to magnetically hold a magnetic work piece on the conveyor, each electromagnet being operable for demagnetizing the work holder and work piece thereon and again magnetizing them to a lower degree and in opposite polarity relative to the previous condition thereof.

11. The method of controlling the magnetic holding of work pieces by permanent magnet work holders comprising placing magnetic work pieces on a plurality of such work holders, moving the work holders with the work pieces thereon through a predetermined path, demagnetizing the work holders and work pieces thereon successively by a single electromagnet and thereby releasing the work pieces from the work holders, and thereafter magnetizing the work holders.

12. The method set out in claim 11 in which the work holders are magnetized without work pieces thereon.

13. The method set out in claim 11 in which the work holders are magnetized with work pieces thereon.

14. The method of demagnetizing a magnetic piece and a permanent magnet work holder in conjunction with a series of electromagnets, comprising magnetizing the electromagnets to progressively lesser-value voltage and in successively opposite polarities, and passing the work holder and piece in magnetic relationship with the electromagnets successively in direction from the greater-value to the lesser-value voltages.

References Cited by the Examiner

UNITED STATES PATENTS

| | | | |
|---|---|---|---|
| 1,146,867 | 7/15 | Griffith | 317—163 |
| 1,199,947 | 10/16 | Walker et al. | 317—163 |
| 1,773,646 | 8/30 | Skore | 198—41 |
| 2,187,240 | 1/40 | Karasick | 317—157.5 X |
| 2,363,336 | 11/44 | Keeler | 317—157.5 |
| 2,526,253 | 10/50 | Merrill | 198—41 |
| 2,526,358 | 10/50 | Howell | 317—157.5 |
| 2,942,162 | 6/60 | Becker | 317—157.5 |
| 2,946,932 | 7/60 | Littwin | 317—157.5 |
| 2,997,866 | 8/61 | Ashe et al. | 317—157.5 X |
| 3,023,879 | 3/62 | Cafferty et al. | 198—41 |

OTHER REFERENCES

"Demagnetizing Parts of Anti-Friction Bearings"; pages 86, 87 in the February 2, 1946, issue of "Electronics World" magazine.

SAMUEL F. COLEMAN, *Primary Examiner.*

SAMUEL BERNSTEIN, WILLIAM B. LA BORDE, *Examiners.*